US012137124B2

(12) United States Patent
Hamouda

(10) Patent No.: US 12,137,124 B2
(45) Date of Patent: Nov. 5, 2024

(54) DETECTING PHYSICAL ANOMALIES OF A COMPUTING ENVIRONMENT USING MACHINE LEARNING TECHNIQUES

(71) Applicant: Dell Products L.P., Round Rock, TX (US)

(72) Inventor: Mahmoud Hussein Hamouda, Giza (EG)

(73) Assignee: Dell Products L.P., Round Rock, TX (US)

( * ) Notice: Subject to any disclaimer, the term of this patent is extended or adjusted under 35 U.S.C. 154(b) by 273 days.

(21) Appl. No.: 17/579,943

(22) Filed: Jan. 20, 2022

(65) Prior Publication Data

US 2023/0231886 A1    Jul. 20, 2023

(51) Int. Cl.
*G06F 15/16*    (2006.01)
*G16Y 40/50*    (2020.01)
*H04L 9/40*    (2022.01)

(52) U.S. Cl.
CPC ............ *H04L 63/205* (2013.01); *G16Y 40/50* (2020.01)

(58) Field of Classification Search
CPC .............................. H04L 63/205; G16Y 40/50
See application file for complete search history.

(56) References Cited

U.S. PATENT DOCUMENTS

2017/0063897 A1\* 3/2017 Muddu ................. G06F 16/444
2020/0117532 A1\* 4/2020 Wolfson ............. G06F 11/0751
2021/0056430 A1\* 2/2021 Wu ........................ G06N 3/006
2021/0133607 A1\* 5/2021 Stubbs ................... G06N 20/00
2021/0307211 A1\* 9/2021 Egger .................. G05B 13/027
2022/0166785 A1\* 5/2022 Grant .................. H04L 63/1416

FOREIGN PATENT DOCUMENTS

KR           2433926 B1 *  8/2022
WO   WO-2022076920 A1 *  4/2022   ....... G01N 35/00029

\* cited by examiner

*Primary Examiner* — Richard G Keehn

(74) *Attorney, Agent, or Firm* — Ryan, Mason & Lewis, LLP

(57) ABSTRACT

Methods, apparatus, and processor-readable storage media for detecting physical anomalies of a computing environment using machine learning techniques are provided herein. An example computer-implemented method includes monitoring a physical environment corresponding to at least one component of a distributed computing system using at least one sensor that is one or more of: at least partially within the at least one component and attached to the at least one component; performing, by the at least one component, a machine learning process comprising: analyzing data generated by the at least one sensor to detect one or more physical anomalies associated with the physical environment, and in response to detecting a physical anomaly, selecting at least one automated action, involving at least one additional component of the distributed computing system, to at least partially mitigate the physical anomaly; and initiating a performance of the at least one automated action.

20 Claims, 6 Drawing Sheets

DETECTING PHYSICAL ANOMALIES OF A COMPUTING ENVIRONMENT USING MACHINE LEARNING TECHNIQUES

FIELD

The field relates generally to information processing systems, and more particularly to physical security in such systems.

BACKGROUND

Computing environments face a range of different types of threats. These threats may concern not only software of the computing environments but also the physical security of the computing environments themselves. Such physical challenges are often magnified in edge computing environments, which are typically highly distributed and decentralized. Accordingly, there is a need for improved techniques to detect and address physical anomalies in computing environments.

SUMMARY

Illustrative embodiments of the disclosure provide techniques for detecting physical anomalies of a computing environment using machine learning techniques. An exemplary computer-implemented method includes monitoring a physical environment corresponding to at least one component of a distributed computing system using at least one sensor that is one or more of: at least partially within the at least one component and attached to the at least one component; performing, by the at least one component, a machine learning process comprising: analyzing data generated by the at least one sensor to detect one or more physical anomalies associated with the physical environment, and in response to detecting a physical anomaly, selecting at least one automated action, involving at least one additional component of the distributed computing system, to at least partially mitigate the physical anomaly; and initiating a performance of the at least one automated action.

Illustrative embodiments can provide significant advantages relative to conventional physical security techniques. For example, challenges associated with physically protecting components of a computing environment, such as an edge computing environment, are overcome in one or more embodiments by detecting physical anomalies based on machine learning techniques that are applied to data obtained from one or more sensors located within the components of the computing environment and performing one or more mitigation actions responsive to such anomalies.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Computing environments are often difficult to protect from physical security threats. Edge computing environments are particularly difficult, as they can have a large number (on the order of thousands or more, for example) of remote edge servers that are geographically distributed (e.g., so that they are close to customer locations or other data sources). Generally, the locations of the edge components are unmanned and located outside of a controlled datacenter environment. As such, there is often a lack of proper technical and security resources to adequately protect these locations from security threats. Thus, such locations generally require higher levels of autonomy and self-protection capabilities.

Physical breaches (e.g., retrieving information directly, or planting malicious software) represent a significant threat to datacenters and the data stored there. For example, malware might compromise systems and/or data in any of a variety of ways, such as by collecting sensitive information for later physical retrieval, sending data to a remote location, altering the data in a malicious manner, or deleting the data.

Accordingly, one or more embodiments described herein can deploy sensors (e.g., internet-of-things (IoT) sensors in a grid) inside a system configured and arranged to detect various physical threats to the system. A backend service can also be provided that is configured to communicate with the sensors, evaluate the threat or threats revealed in the sensor data collected by the sensors, and provide for the implementation of one or more measures to mitigate the detected threat. In at least some embodiments, it is to be appreciated that a system is interpreted to comprise not only the hardware and software of the system but also the data stored in the system.

Figure 1:
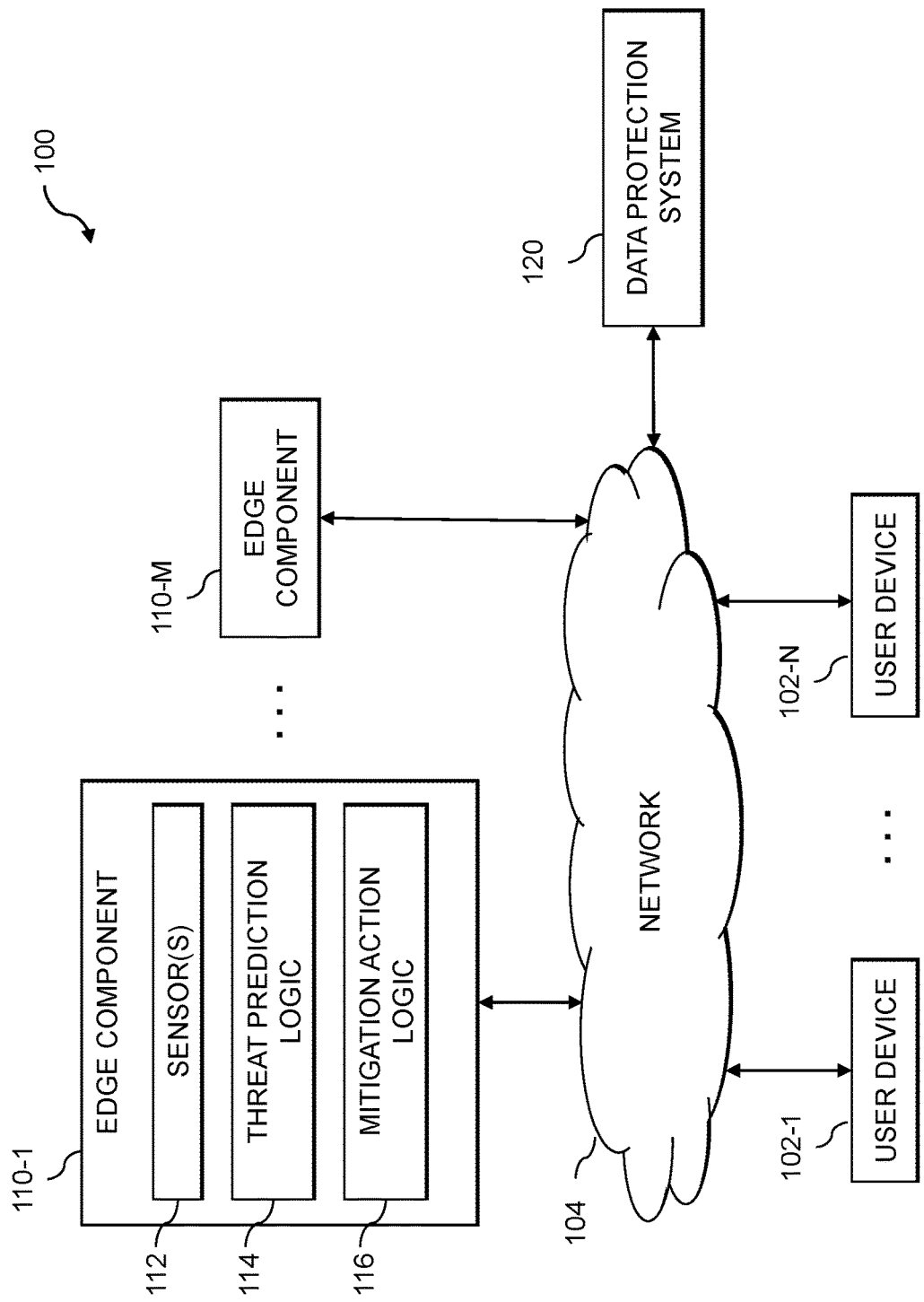
FIG. 1 shows an information processing system configured for detecting physical anomalies using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, . . . 102-N, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 are a plurality of edge components 110-1, . . . 110-M (collectively referred to herein as edge components 110), and a data protection system 120.

The edge components 110, in some embodiments, may be located in different geographical locations. The term "edge component" as used herein is intended to be broadly construed, so as to encompass, for example, at least a portion of an edge server, a network device, or a storage array in an edge computing environment, for example.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

Also associated with the user devices 102 are one or more input-output devices, which illustratively comprise keyboards, displays or other types of input-output devices in any combination. Such input-output devices can be used, for example, to support one or more user interfaces to the user devices 102, as well as to support communication between the one or more edge components 110, the data protection system 120, and/or other related systems and devices not explicitly shown.

The network 104 is assumed to comprise a portion of a global computer network such as the Internet, although other types of networks can be part of the computer network 100, including a wide area network (WAN), a local area network (LAN), Narrowband-IoT (NB-IoT), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

In the FIG. 1 embodiment, the edge component 110-1 can have at least one associated database (not explicitly shown in FIG. 1) configured to store sensor data obtained from one or more sensors 112. The edge component 110-1 includes threat prediction logic 114 and mitigation action logic 116. Generally, the threat prediction logic 114 transforms the data from the sensors 112 into a format that can be consumed by a machine learning model. The machine learning model can analyze the data and detect potential threats. Additionally, the machine learning model can decide on one or more automated actions to at least partially mitigate such threats, as described in more detail below in conjunction with FIG. 2, for example.

The sensors 112, in some embodiments, may correspond to a sensor array comprising one or more IoT sensors. The IoT sensors may alternatively be referred to as IoT edge sensors and include, but are not limited to, sensors, actuators or other devices that produce information and/or are responsive to commands to measure, monitor and/or control the environment that they are in. As used herein, the term "sensors" can encompass both sensors and alarms. Sensors within the scope of this disclosure may operate automatically and/or may be manually activated. In general, the type, number, location, and combination of sensors can be based on considerations including, but not limited to, the type(s) of threats most likely to be encountered, the proximity of potential threat sources, and the amount of time needed to implement one or more preemptive and/or mitigative actions once a threat has been identified.

Non-limiting examples of sensors 112 include, but are not limited to, vibration sensors, input frequency variations sensors (e.g., to measure internal vibration), humidity sensors (e.g., to measure humidity and water leakage), motion sensors (e.g., to monitor the internal movement and physical security of the edge component), particulate dust sensors (e.g., to monitor particulate penetration inside the server), humidity gauges, temperature gauges, seismometers, and airflow. Other sensors, in at least some embodiments, may be manually activated, such as a manually activated fire alarm, for example, or an intruder alert or panic button, as another example. The foregoing and/or other sensors can be employed in any combination, type, and number.

Generally, the sensors 112 are collocated with the edge component 110-1 so as to detect actual and/or potential threats to a specific system or a cluster of systems. For example, a given sensor 112 may be implemented at one or more edges of each system enclosure or nested on a system board associated with edge component 110-1.

As noted above, the edge component 110-1 may also include mitigation action logic 116. Generally, the mitigation action logic 116 performs one or more automated actions in order to mitigate detected threats. For example, an automated action may include migrating or replicating data to a data protection system 120. The data protection system 120 can include, for example, databases, database servers, metadata servers, backup servers, backup systems, restore servers, restore systems, storage systems, storage disks, communication components and communication networks, memory devices, storage devices, climate control systems, power sources, power distribution systems, and/or other components which may be operable to carry out at least a portion of an automated action.

Databases associated with edge component 110, in some embodiments, can be implemented using one or more corresponding storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the other edge components 110 may be implemented in a similar manner as edge component 110-1, for example. Additionally, each of the one or more edge components 110 in the FIG. 1 embodiment is assumed to be implemented using at least one processing device. Each such processing device generally comprises at least one processor and an associated memory, and implements one or more functional modules for controlling certain features of the edge components 110. More particularly, the one or more edge components 110 in this embodiment can each comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interfaces allow for communication between the one or more edge components 110, the data protection system 120, and/or the user devices 102 over the network 104, and each illustratively comprises one or more conventional transceivers.

It is to be appreciated that the particular arrangement of elements 114, and 116 illustrated in the edge component 110-1 of the FIG. 1 embodiment is presented by way of example only, and alternative arrangements can be used in other embodiments. For example, the functionality associated with elements 114 and 116 in other embodiments can be combined into a single module, or separated across a larger number of elements. As another example, multiple distinct processors can be used to implement different ones of the elements 114 and 116 or portions thereof.

At least portions of elements 114 and 116 may be implemented at least in part in the form of software that is stored in memory and executed by at least one processor.

It is to be understood that the particular set of elements shown in FIG. 1 for one or more edge components 110 and/or user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the one or more edge components 110 and at least one associated database can be on and/or part of the same processing platform.

An exemplary process utilizing elements 114 and 116 of an example edge component 110-1 in computer network 100 will be described in more detail with reference to, for example, the flow diagrams of FIGS. 3 and 4.

Figure 2:
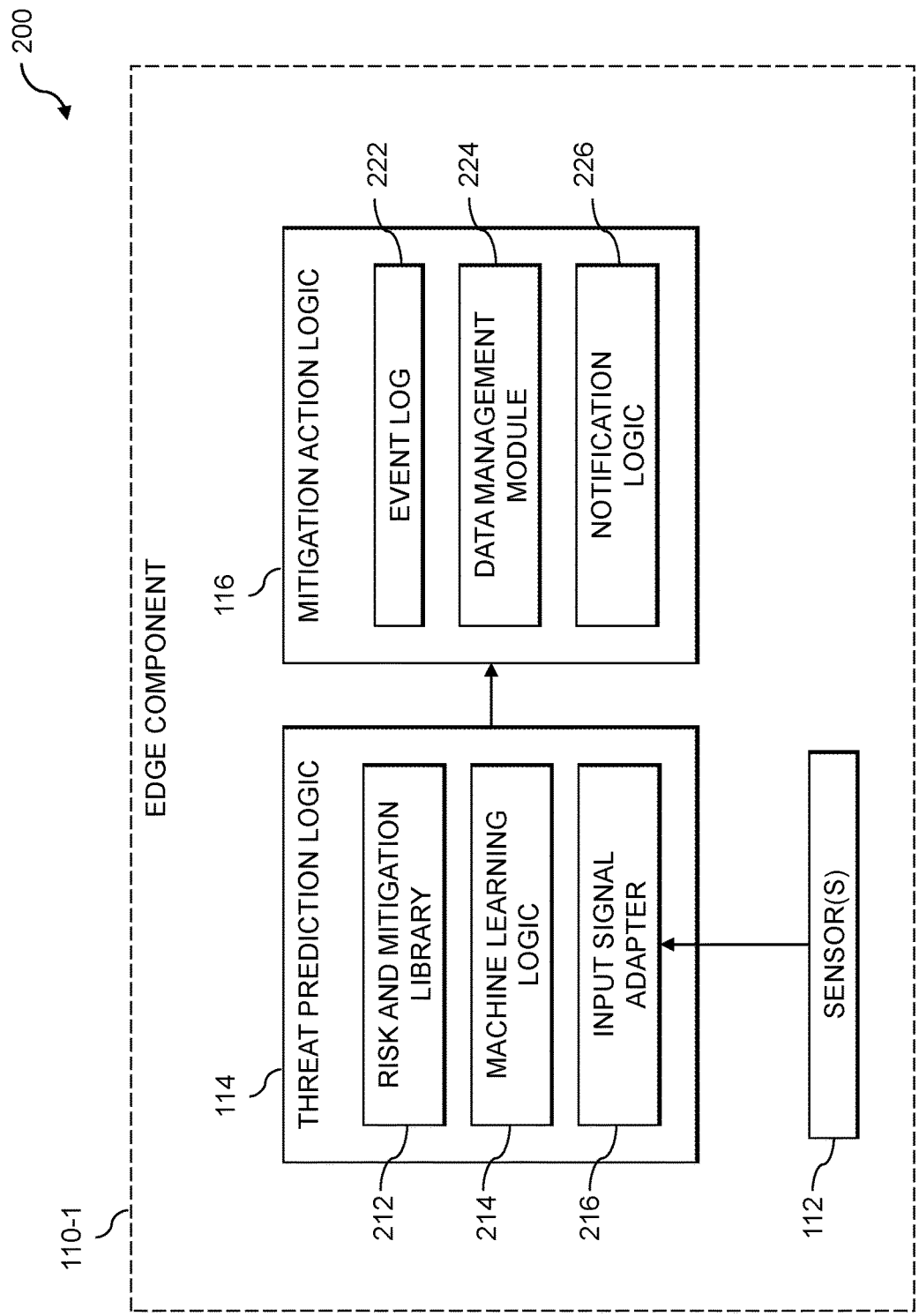
FIG. 2 shows a block diagram of an architecture in an illustrative embodiment.

FIG. 2 shows a block diagram of an architecture 200 in an illustrative embodiment. In some embodiments, the architecture 200 can correspond to at least a portion of edge component 110-1 as indicated by the dashed rectangle. By way of example, at least one of the threat prediction logic 114, and the mitigation action logic 116 can be implemented on a system on a chip (SoC) hosted within the edge component 110-1 that is configured to obtain data from the one or more sensors 112. In such embodiments, the SoC can take the form of, or include, a physical computing device as well, where at least one of the elements in the SoC comprises an operating system that supports appropriate libraries to host a machine learning algorithm. The operating system of the SoC can be separate from any other operating system that is associated with the edge component 110-1, for example.

In the FIG. 2 embodiment, the threat prediction logic 114 includes a risk and mitigation library 212, machine learning logic 214, and an input signal adapter 216. The risk and mitigation library 212, in some embodiments, stores data pertaining to a set of automated actions that can be taken to protect against potential threats. As discussed hereinafter, in the example of FIG. 2, the machine learning logic 214 selects and initiates an implementation of one or more automated actions from the set of automated actions.

The input signal adapter 216 is configured to obtain and process signals from the one or more sensors 112. The processed signals, in this example, are fed to the machine learning logic 214. Generally, the machine learning logic 214 implements one or more machine learning processes that are used to improve the efficiency and effectiveness of processes for implementing preemptive actions for data protection and preservation. In general, as used herein, machine learning refers to a subset of artificial intelligence in the field of computer science that may use statistical techniques to give computers the ability to learn with data, that is, progressively improve performance of one or more particular tasks, without having been explicitly programmed to generate, or perform, the improved tasks.

In some embodiments, a machine learning process can correspond to a supervised machine learning process, where the machine learning logic 214 is presented with example inputs and the desired corresponding outputs, given by a "teacher." The inputs can include data (or representations of data) corresponding to a simulation or known occurrence of a physical incident. The goal in this case is for the machine learning logic 214 to learn a general rule that maps inputs to outputs. In some cases, the input signal may be only partially available, or the input signal may be limited to special feedback. It is noted that having a wide variety of automated actions available can be important, at least, since the correct action(s) can then be readily selected and implemented. For example, any number of different automated actions or measures may be desirable for each application. The machine learning process, in at least one embodiment, may include a Bonsai Tree-based machine learning algorithm or a support vector machine (SVM) algorithm, for example.

As an example, in one or more embodiments, data can be obtained from sensors during periods of time when different types of physical incidents are simulated. The data from the different simulations can be labeled with the corresponding type of incident, and thus can be used as training data to train the machine learning process to predict when a particular type of physical incident is occurring.

In at least some embodiments, machine learning logic 214 can implement a process to learn from situations where one or more automated actions are initiated in response to a possible threat detected using the data from the input signal adapter 216, and where the threat later turns out to be a false positive. In such situations, there are costs associated with implementing the one or more automated actions, and also costs associated with returning the system to a normal state of operations. Accordingly, the machine learning logic 214 for selecting and implementing automated actions may provide an automatic mechanism that can identify an acceptable balance between data and/or application availability on the one hand, and the consequences of the speed (e.g., too quickly or slowly) in which a given automated action is taken on the other hand.

For instance, the risk and mitigation library 212, in some embodiments, may include a definition of a set of actions (e.g., $A_1 \ldots AN$), each corresponding to an operation that can be performed on a system (e.g., edge component 110-1) at a given time. By way of example, the set of actions may be defined as follows: $A_1$=perform failover on application to remote location and $A_2$=shut down server of application. An iterative machine learning process (e.g., implemented by machine learning logic 214), may evaluate a physical state using data from the sensors 112, select one or more actions (e.g., $\{A_i\}$) defined in the risk and mitigation library 212 to perform, and then move to the next iteration of the machine learning process, as described in more detail in conjunction with FIG. 3, for example.

Additionally, in the FIG. 2 embodiment, the mitigation action logic 116 includes an event log 222, data management module 224, and notification logic 226. The event log 222 can track the threats detected by the threat prediction logic 114, any automated actions taken in response to the detected threats, and feedback to such actions. The event log 222 can provide feedback to the machine learning logic 214 to improve results of the machine learning process, for example.

The data management module 224 is configured to facilitate one or more actions selected by the threat prediction logic 114 in response to a potential threat. For example, assume a given automated action includes moving data, or some other action that communicates with an external component, then the data management module 224 can migrate or replicate the data on an external system (e.g., data protection system 120).

The notification logic 226 can comprise one or more external application programming interface (API) connectors to facilitate a particular automated action. In such embodiments, the APIs can be used to lock down parts of the system (e.g., parts of computer network 100, which may include at least one of: parts of the edge component 110-1, parts of the other edge components 110, configurations, or network ports). Also, the notification logic 226 can provide notifications to an external alarm system (not explicitly shown in FIG. 2). For example, the external alarm system may communicate, and operate in connection with various components (e.g., which may or may not be in the computer network 100) to implement, and/or cause the implementation of, one more of the automated actions. Such components, in some embodiments, can include a facilities management system, an operations system, or a local alarm system, as non-limiting examples.

Figure 3:
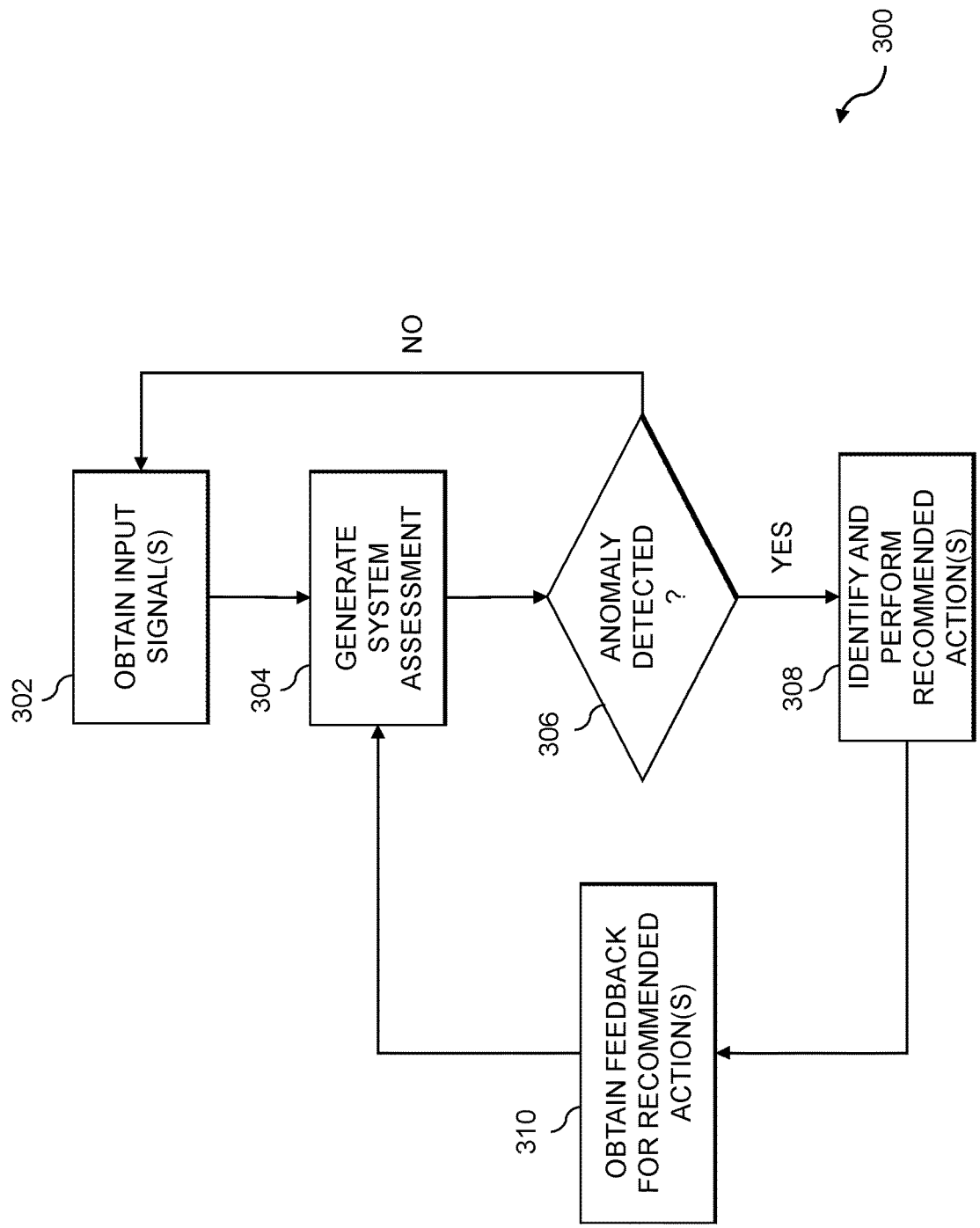
FIG. 3 shows a process flow diagram of a machine learning process in an illustrative embodiment.

Referring now to FIG. 3, a process flow diagram is shown of a machine learning process 300 in an illustrative embodiment. The machine learning process 300, in some embodiments, may be operated at least in part using machine learning logic 214. The process in FIG. 3 includes steps 302-310, although it is to be appreciated that in other embodiments, more, or fewer, steps may be employed. The process 300, in at least some embodiments, may be performed iteratively, where the time between iterations can be specified (e.g., by a user). In one example embodiment, the time between iterations can be about five minutes, but longer or shorter times may be used.

Step 302 includes obtaining one or more input signals. For example, the one or more input signal may comprise one or more streams of data corresponding to the sensors 112.

Step 304 includes generating a system assessment. As part of, or preliminary to, step 304, an evaluation of the state of the internal environment can be performed. This evaluation may be based at least in part on sensor data. The system assessment may be focused on a small number of considerations or may be relatively comprehensive. For example, the system assessment can include assessing the computing environment and the current state of the system. Some, or all, parts of the system assessment can be performed iteratively, and information considered at the assessment may be substantially real-time information and/or may be historical information obtained from a database or storage.

In some embodiments, step 304 may include enumerating or identifying entities potentially and/or actually impacted by one or more events. Such entities may be hardware, software, and/or combinations of hardware and software. Example entities include, but are not limited to, servers, applications, storage devices, replication engines, data protection software including backup and restore applications, and any other entity that may be, and/or has been, adversely affected by an event. As part of the identification of entities, step 304 can also include assessing the respective states of those entities such as, for example, whether an application is running. Accordingly, a wide variety of different items may be considered at step 304. In general, any item or consideration that relates in any way to a threat, and/or to threatened data, may be evaluated, and considered.

Step 306 includes a test to determine whether an anomaly is detected. If yes, then the process continues to step 308, otherwise, the process 300 returns to step 302.

Step 308 includes identifying one or more recommended actions. For example, step 308 may include identifying the best action out of a set of chosen actions, where the action corresponds to the independent variables of a machine learning model (e.g., implemented by machine learning logic 214). Step 308 may include automatically identifying possible recovery actions, such as recovery actions that are common to multiple entities. For example, an action to shut down a server may apply to one, some, or all applications in a system. In some embodiments, the possible recovery actions for one or more entities may be obtained from the entity itself (e.g., edge component 110-1), or from another source (e.g., data protection system 120), which can be specific to a particular entity or subset of entities. Step 308 also includes performing the identified recommended actions. As an example, step 308 can include instructing or notifying relevant components or entities to carry out the identified actions.

Step 310 is optional and includes obtaining feedback for actions recommended at step 308, which can be used to improve the machine learning model. For example, the feedback can be obtained from an end user on the usefulness of the identified recommended actions, such as by rating the ability of the actions to detect, prevent and/or mitigate a physical intrusion.

It is to be appreciated that the feedback provided at step 310 can help provide more effective and efficient results. For example, the feedback can help the machine learning model learn to distinguish between a minor movement of a device and an actual physical intrusion attempt. Such a machine learning process can be trained on data from actual events that have occurred and/or the machine learning process may be run using hypothetical data generated in connection with a model or simulation. As the machine learning process progresses, the model may be continuously improved. Thus, the machine learning process may comprise, or consist of, a closed-loop feedback system for continuous improvement of the model.

In at least one embodiment, the system assessment generated at step 304, can include determining the impact of the performance of particular actions on a finite resource, such as data transmission/communication bandwidth. That is, the bandwidth requirement associated with a potential recovery action can be identified, and the impact in this case would be that the available bandwidth for other operations, which may or may not be other recovery actions, would be decreased. In some examples, the amount of bandwidth available may dictate that an alternative approach be employed for one or more of the identified actions. Thus, for example, if the bandwidth will not support synchronous replication, the recovery action may take the form of asynchronous replication instead.

The system assessment, in some embodiments, may also involve identifying and resolving conflicts between or among two or more possible actions. For instance, one recovery action may be to shut down a server, while another recovery action may be to create snapshots of the applications on that server. However, if the server is shut down, the snapshots cannot be created. Thus, there is a conflict between the two recovery actions. In some embodiments, the conflict can be resolved by prioritizing one of the recovery actions over the other so that one recovery action is performed but the other is not. Alternatively, the recovery actions can be performed in a specified sequence, if possible (e.g., the snapshots can be taken before the server is shut down). Still another possibility is to resolve the conflict by identifying one or more alternative recovery actions and/or simply not performing either of the initially identified recovery actions.

It is to be appreciated that this particular process shows just one example implementation of a portion of a machine learning technique, and alternative implementations of the process can be used in other embodiments.

Accordingly, one or more embodiments described herein can improve system security at least in part by deploying IoT sensors for physical threat and disaster detection. Such IoT sensors can be deployed inside the system so that every node has the ability to apply the same physical security standards, even if the nodes are geographically distributed. Also, in contrast to conventional techniques, the data from the sensors and/or other sources do not necessarily automatically trigger a preemptive action, as the machine learning process can learn to determine whether a sensor signal is sufficient or not to amount to a physical or environmental threat. Such threats can include, for example, threats resulting from accidental or weather-related events (e.g., floods, hurricanes, fires, etc.) or intentional events (e.g., physically tampering with or damaging one or parts of the system).

Accordingly, embodiments described herein can help maintain data integrity and availability. This may be particularly useful for edge computing environments, as a given edge component can identify and act on potential threats itself using locally collected information, can alert appropriate entities, and/or can lock down or even wipe sensitive information from the node.

It is noted that the automated actions to mitigate against potential threats can include both preemptive actions (e.g., before a threat actually impacts a system) and recovery actions (e.g., after a threat at least partially affects the system). It is to be understood that such actions can include actions that directly affect data associated with the system (e.g., copying stored data to another location), as well as actions that may indirectly affect the stored data (e.g., locking access to specific networking ports).

Figure 4:
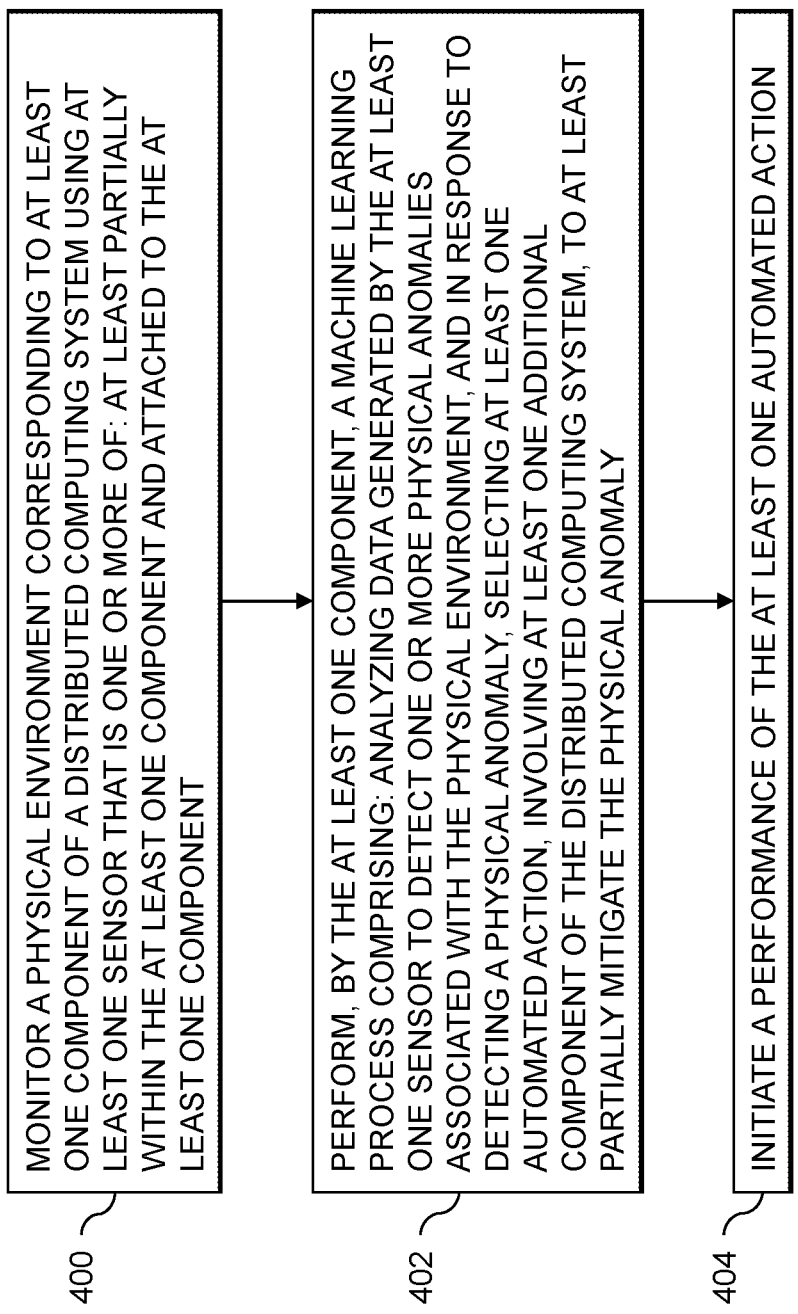
FIG. 4 shows a flow diagram of a process for detecting physical anomalies of a computing environment using machine learning techniques in an illustrative embodiment.

FIG. 4 shows a flow diagram of a process for detecting physical anomalies of a computing environment using machine learning techniques in an illustrative embodiment. It is to be understood that this particular process is only an example, and additional or alternative processes can be carried out in other embodiments.

In this embodiment, the process includes steps 400 through 404. These steps are assumed to be performed by the edge component 110-1 utilizing at least in part threat prediction logic 114 and mitigation action logic 116.

Step 400 includes monitoring a physical environment corresponding to at least one component of a distributed computing system using at least one sensor that is one or more of: at least partially within the at least one component and attached to the at least one component. Step 402 includes performing, by the at least one component, a machine learning process comprising: analyzing data generated by the at least one sensor to detect one or more physical anomalies associated with the physical environment, and in response to detecting a physical anomaly, selecting at least one automated action, involving at least one additional component of the distributed computing system, to at least partially mitigate the physical anomaly. Step 404 includes initiating a performance of the at least one automated action.

At least one other component of the distributed computing system may perform a different instance of the machine learning process by analyzing data from at least one other sensor that is one or more of: at least partially within the at least one other component and attached to the at least one other component. The analyzing and the selecting of the machine learning process may apply at least one machine learning model, and the machine learning process may further include: obtaining user feedback related to at least one of: the detected one or more physical anomalies and the at least one automated action; and updating the at least one machine learning model based on the user feedback. The machine learning process may be performed by a system on a chip hosted by the at least one component. The system on a chip may include an operating system that is separate from any other operating system associated with the at least one component. The at least one sensor may be at least one of: integrated into at least one circuit board of the at least one component; located at least partially within a physical enclosure of the at least one component; and attached to a physical enclosure of the at least one component. The at least one sensor comprises at least one of: a vibration sensor; a power input frequency sensor; humidity sensor; motion sensor; and a particulate dust sensor. The one or more physical anomalies comprise at least one of: an attempt to physically tamper with the at least one component; and one or more types of environmental hazards. The machine learning process may include: evaluating a set of automated actions and selecting the at least one automated action from the set based on at least one of: one or more conflicts between the automated actions in the set and times required to perform the respective automated actions in the set. The selecting may be based at least in part on an impact of each of the automated actions in the set on the distributed computing system. The at least one automated action may include at least one of: copying stored data to the at least one additional component; and blocking access to one or more network ports corresponding to one or more of: the at least one component and one or more other components of the distributed computing system. The at least one additional component may be at a different location than the at least one component.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve data security against physical threats. These and other embodiments can effectively overcome problems associated with existing security techniques that generally rely on security personnel and/or personnel with security expertise. For example, some embodiments are configured to automatically identify potential threats and perform actions to mitigate such threats in a timely manner (e.g., before a threat affects the system itself).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
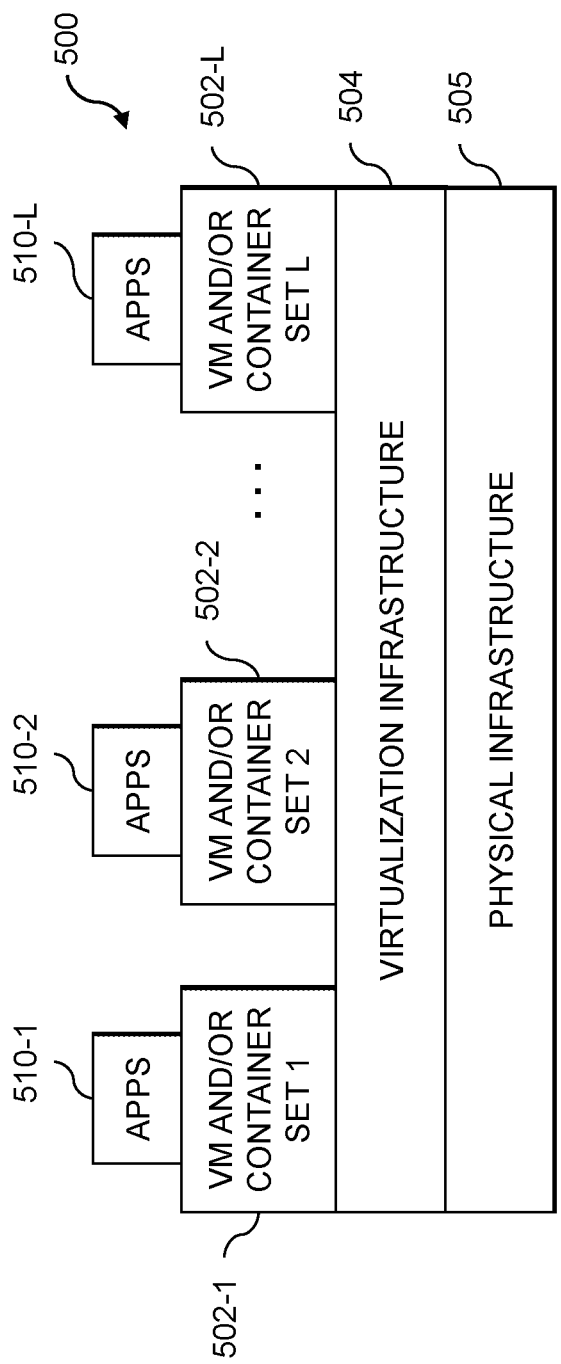
FIGS. 5 and 6 show examples of processing platforms that may be utilized to implement at least a portion of an information processing system in illustrative embodiments.
Figure 6:
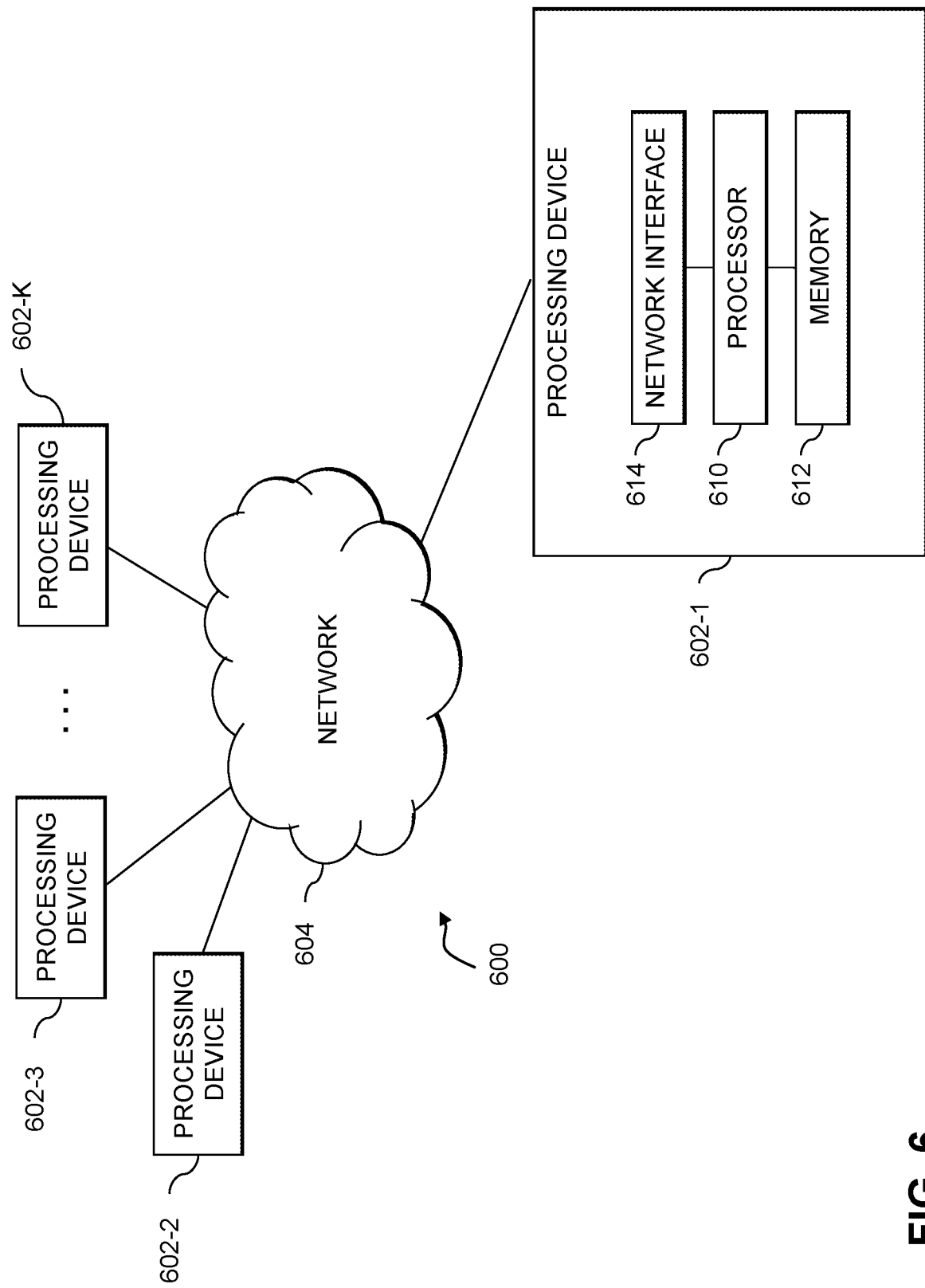

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a NB-IoT, Wi-Fi or WiMAX network, or various portions or combinations of these and other types of networks.

The processing device 602-1 in the processing platform 600 comprises a processor 610 coupled to a memory 612.

The processor 610 comprises a microprocessor, a CPU, a GPU, a TPU, a microcontroller, an ASIC, an FPGA or other type of processing circuitry, as well as portions or combinations of such circuitry elements.

The memory 612 comprises RAM, ROM or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
monitoring a physical environment corresponding to at least one component of a distributed computing system using at least one sensor that is at least partially within the at least one component;
performing a local machine learning process, independently executed by the at least one component, comprising:
analyzing data generated by the at least one sensor to detect one or more physical anomalies associated with the physical environment, and
in response to detecting a physical anomaly, selecting at least one automated action, involving at least one additional component of the distributed computing system, to at least partially mitigate the physical anomaly; and
initiating a performance of the at least one automated action;
wherein the method is performed by at least one processing device comprising a processor coupled to a memory.

2. The computer-implemented method of claim 1, wherein at least one other component of the distributed computing system performs a different instance of the local machine learning process by analyzing data from at least one other sensor that is one or more of: at least partially within the at least one other component and attached to the at least one other component.

3. The computer-implemented method of claim 1, wherein the analyzing and the selecting apply at least one machine learning model, and wherein the local machine learning process further comprises:

obtaining user feedback related to at least one of: the detected one or more physical anomalies and the at least one automated action; and updating the at least one machine learning model based on the user feedback.

4. The computer-implemented method of claim 1, wherein the local machine learning process is performed by a system on a chip hosted by the at least one component.

5. The computer-implemented method of claim 4, wherein the system on a chip comprises an operating system that is separate from any other operating system associated with the at least one component.

6. The computer-implemented method of claim 1, wherein the at least one sensor is at least one of:
integrated into at least one circuit board of the at least one component;
located at least partially within a physical enclosure of the at least one component; and
attached to a physical enclosure of the at least one component.

7. The computer-implemented method of claim 6, wherein the at least one sensor comprises at least one of:
a vibration sensor;
a power input frequency sensor;
a humidity sensor;
a motion sensor; and
a particulate dust sensor.

8. The computer-implemented method of claim 1, wherein the one or more physical anomalies comprises at least one of:
an attempt to physically tamper with the at least one component; and
one or more types of environmental hazards.

9. The computer-implemented method of claim 1, wherein the local machine learning process comprises:
evaluating a set of automated actions and selecting the at least one automated action from the set based on at least one of: one or more conflicts between the automated actions in the set and times required to perform the respective automated actions in the set.

10. The computer-implemented method of claim 9, wherein the selecting is based at least in part on an impact of each of the automated actions in the set on the distributed computing system.

11. The computer-implemented method of claim 1, wherein the at least one automated action comprises at least one of:
copying stored data to the at least one additional component; and
blocking access to one or more network ports corresponding to one or more of: the at least one component and one or more other components of the distributed computing system.

12. The computer-implemented method of claim 1, wherein the at least one additional component is at a different physical location than the at least one component.

13. A non-transitory processor-readable storage medium having stored therein program code of one or more software programs, wherein the program code when executed by at least one processing device causes the at least one processing device:
to monitor a physical environment corresponding to at least one component of a distributed computing system using at least one sensor that is at least partially within the at least one component;
to perform a local machine learning process, independently executed by the at least one component, comprising:
analyzing data generated by the at least one sensor to detect one or more physical anomalies associated with the physical environment, and
in response to detecting a physical anomaly, selecting at least one automated action, involving at least one additional component of the distributed computing system, to at least partially mitigate the physical anomaly; and
to initiate a performance of the at least one automated action.

14. The non-transitory processor-readable storage medium of claim 13, wherein at least one other component of the distributed computing system performs a different instance of the local machine learning process by analyzing data from at least one other sensor that is one or more of: at least partially within the at least one other component and attached to the at least one other component.

15. The non-transitory processor-readable storage medium of claim 13, wherein the analyzing and the selecting apply at least one machine learning model, and wherein the local machine learning process further comprises:
obtaining user feedback related to at least one of: the detected one or more physical anomalies and the at least one automated action; and
updating the at least one machine learning model based on the user feedback.

16. The non-transitory processor-readable storage medium of claim 13, wherein the local machine learning process is performed by a system on a chip hosted by the at least one component.

17. The non-transitory processor-readable storage medium of claim 13, wherein the local machine learning process comprises:
evaluating a set of automated actions and selecting the at least one automated action from the set based on at least one of: one or more conflicts between the automated actions in the set and times required to perform the respective automated actions in the set.

18. An apparatus comprising:
at least one processing device comprising a processor coupled to a memory;
the at least one processing device being configured:
to monitor a physical environment corresponding to at least one component of a distributed computing system using at least one sensor that is at least partially within the at least one component;
to perform a local machine learning process, independently executed by the at least one component, comprising:
analyzing data generated by the at least one sensor to detect one or more physical anomalies associated with the physical environment, and
in response to detecting a physical anomaly, selecting at least one automated action, involving at least one additional component of the distributed computing system, to at least partially mitigate the physical anomaly; and
to initiate a performance of the at least one automated action.

19. The apparatus of claim 18, wherein at least one other component of the distributed computing system performs a different instance of the local machine learning process by analyzing data from at least one other sensor that is one or more of: at least partially within the at least one other component and attached to the at least one other component.

20. The apparatus of claim 18, wherein the analyzing and the selecting apply at least one machine learning model, and wherein the local machine learning process further comprises:
  obtaining user feedback related to at least one of: the detected one or more physical anomalies and the at least one automated action; and
  updating the at least one machine learning model based on the user feedback.

\* \* \* \* \*